J. F. BUTLER.
WASHER.
APPLICATION FILED FEB. 8, 1913.

1,075,760.

Patented Oct. 14, 1913.

WITNESSES
A. R. Stanton
M. E. Shaw.

INVENTOR:
Joseph F. Butler.
Attorney.

UNITED STATES PATENT OFFICE.

JOSEPH F. BUTLER, OF GORDON, TEXAS, ASSIGNOR OF ONE-HALF TO JOHN L. CUNNINGHAM, OF PALO PINTO, TEXAS.

WASHER.

1,075,760.

Specification of Letters Patent.   Patented Oct. 14, 1913.

Application filed February 3, 1913.   Serial No. 747,056.

*To all whom it may concern:*

Be it known that I, JOSEPH F. BUTLER, a citizen of the United States, residing at Gordon, in the county of Palo Pinto and State of Texas, have invented certain new and useful Improvements in Washers, of which the following is a specification.

This invention relates to washers, and one of the principal objects of the invention is to provide a washer composed of two pivoted members, which can be swung open to insert the washer without removing the bolt or spoke upon which the washer is to be placed.

When the spokes of a wooden wheel become loosened, it is very desirable to have a washer to insert between the shoulder on the spoke and the felly. There are many other places where a washer of this character is very advantageous.

My invention is very simple and efficient for its purpose, can be quickly applied, and can not become detached or displaced so long as there is pressure upon the sides of the washer.

Figure 1:
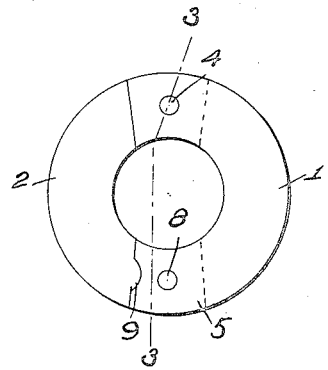
Figure 2:
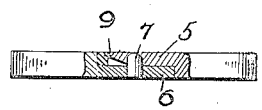
Figure 3:
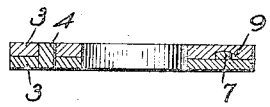
Figure 4:
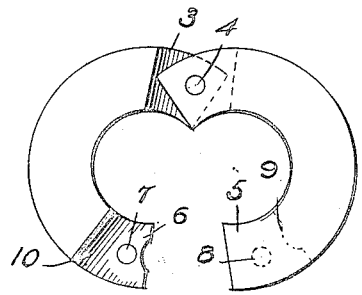

The objects and advantages referred to may be attained by means of the construction illustrated in the accompanying drawings, in which:

Figure 1 is a plan view of a washer made in accordance with my invention. Fig. 2 is an edge view, shown partly broken away. Fig. 3 is a sectional view on the line 3—3 of Fig. 1. Fig. 4 is a plan view of the washer opened.

Referring to the drawing the numeral 1 designates one member of the washer, and 2 is the other member thereof. These two halves or members are substantially identical in form, and each represents a half circle or ring of any required thickness depending upon the purpose for which the washer is designed. The members 1 and 2 are each provided with a rabbeted or recessed end 3 designed to overlap the end of the companion member, when the two members are brought together. Two of the overlapping ends are connected together by a pivot 4, and the recesses 3 of the pivoted ends are plane and flat. The detachable ends 5 and 6 are brought together around a bolt or spoke, and secured by means of the stud 7 entering the perforation 8. The end 5 of the member 1 is grooved as at 9 so that the stud 7 may be moved into the perforation 8 without springing the two members 1 and 2 apart. It is to be noted that if the pivotal pin 4 is comparatively tight and that there are no relative movements permitted to the members 1 and 2 excepting the pivotal movement, then the stud 7 could not be moved into the perforation 8 for the reason that it would meet with interference by the edge of the member 5. This, however, is obviated by the groove in line with the stud 7 in the member 5. The end 6 is rounded to fit the groove 9 as shown more clearly in Fig. 3.

From the foregoing it will be obvious that my washer may be utilized for many purposes, is simple in construction, can be quickly applied, is strong, durable, and efficient for its purpose, and can be manufactured at slight cost.

I claim:

1. A washer comprising two half-ring members provided with recessed ends, said members being pivoted together, the free end of one of the members having a groove and perforation therein, and the other free end having a stud and rounded portion to fit the groove.

2. A washer consisting of two pivotally connected members, one of said members being provided with a concave recess and perforation at its free end, and the other member having a stud and convex recess in its free end.

In testimony whereof I have affixed my signature in presence of two witnesses.

JOSEPH F. BUTLER.

Witnesses:
 WM. S. DAWSON,
 EUNA SWANK.